United States Patent
Silver et al.

(10) Patent No.: US 7,356,132 B1
(45) Date of Patent: Apr. 8, 2008

(54) TUNE MASTER TELEPHONE

(75) Inventors: Edward Michael Silver, Atlanta, GA (US); Linda Ann Roberts, Decatur, GA (US); Hong Thi Nguyen, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 485 days.

(21) Appl. No.: 10/201,043

(22) Filed: Jul. 23, 2002

(51) Int. Cl.
*H04M 1/64* (2006.01)

(52) U.S. Cl. .............................. 379/88.21; 379/142.06; 379/374.01; 455/415

(58) Field of Classification Search ............. 379/88.19, 379/88.2, 88.21, 142.01, 142.06, 373.01, 379/374.01; 455/415, 567
See application file for complete search history.

(56) References Cited

U.S. PATENT DOCUMENTS

| | | | |
|---|---|---|---|
| 5,384,831 A | 1/1995 | Creswell et al. | 379/67 |
| 5,544,229 A | 8/1996 | Creswell et al. | 379/67 |
| 6,314,306 B1 | 11/2001 | Harris | 455/566 |
| 6,366,791 B1 * | 4/2002 | Lin et al. | 455/567 |
| 6,381,594 B1 | 4/2002 | Eichstaedt et al. | 707/3 |
| 6,418,330 B1 * | 7/2002 | Lee | 455/567 |
| 6,697,470 B2 * | 2/2004 | McDonough | 379/142.01 |
| 6,707,908 B1 * | 3/2004 | Nagasawa | 455/567 |
| 6,804,289 B2 | 10/2004 | Takahashi | |
| 6,999,752 B2 | 2/2006 | Fukaya | |
| 7,031,453 B1 | 4/2006 | Busardo | |
| 2002/0094076 A1 * | 7/2002 | Chen | 379/373.01 |
| 2002/0172338 A1 | 11/2002 | Lee, et al | |
| 2004/0037403 A1 | 2/2004 | Koch | |
| 2004/0067751 A1 | 4/2004 | Vandermeijden, et al. | |

OTHER PUBLICATIONS

Filing Receipt for 10/279,352, filed Oct. 24, 2002, "Systems and Methods for Caller-Controlled Tune Notification of a Call."
U.S. Appl. No. 10/279,352, filed Oct. 24, 2002, entitled "Systems and Methods for Caller-Controlled Tune Notification of a Call."
Softswitch Model Drives New Age of Customized Communication, *A CommWorks Position Paper*, www.softswitch,org/educational/reference.asp, in existence at least as of Sep. 9, 2002.
International Softswitch Consortium Reference Architecture, *Softswitch Consortium*, vol. 1.2, Jun. 2002.
ISC Reference Architecture - Functional Plans, *Softswitch Consortium*, vol 1.0, Jan. 2002.

* cited by examiner

*Primary Examiner*—Gerald Gauthier
(74) *Attorney, Agent, or Firm*—Thomas, Kayden, Horstemeyer & Risley

(57) ABSTRACT

Systems for providing a tune master telephone includes a telecommunications network and a communications device that is operatively coupled to the telecommunications network. The telecommunications network is configured to provide caller identification information for an incoming telephone call. The communications device is configured to receive the caller identification information, to associate a tune with the caller identification information, and to play the tune associated with the caller identification information as notification of an incoming call. Other systems and methods are also provided.

3 Claims, 6 Drawing Sheets

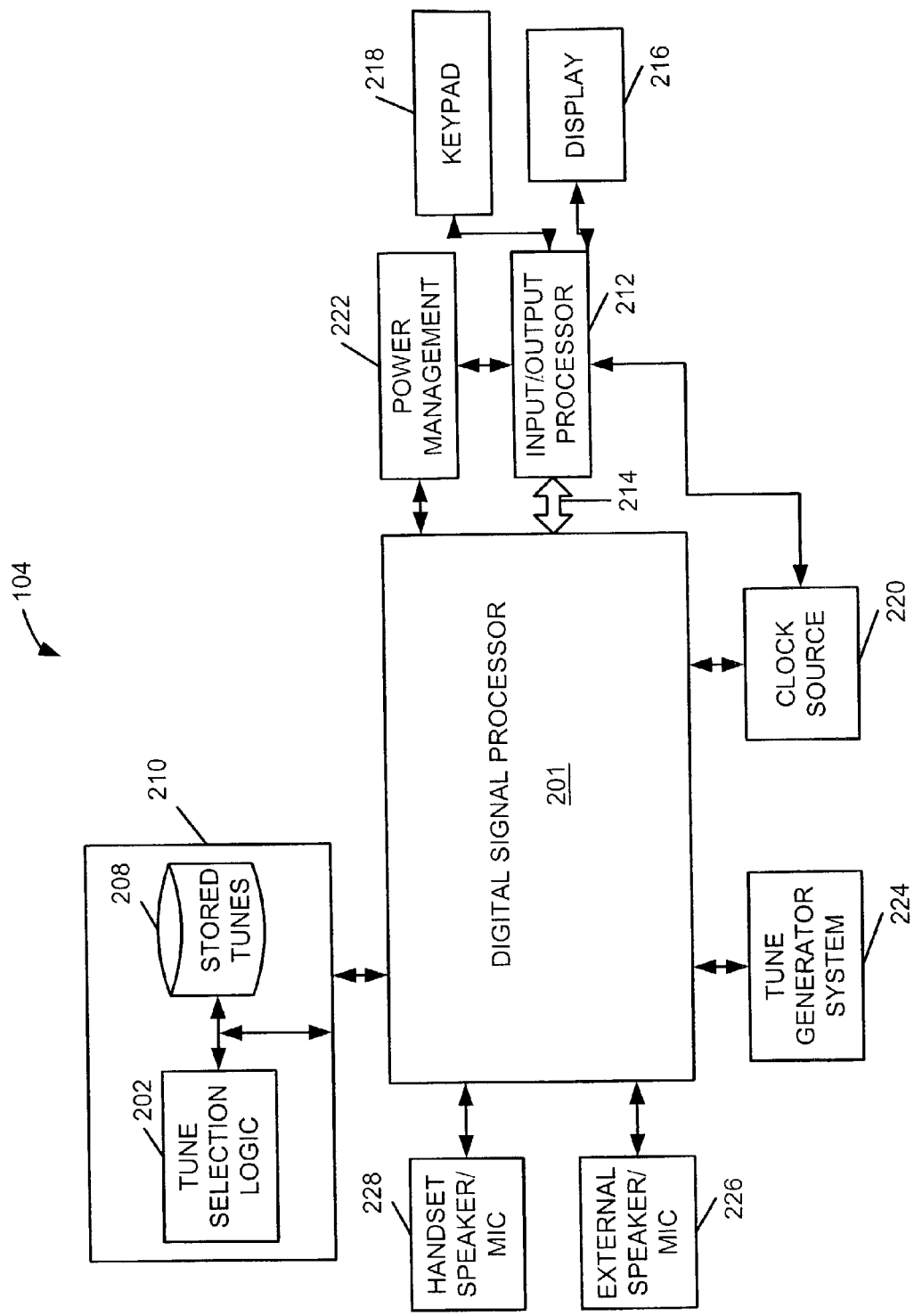

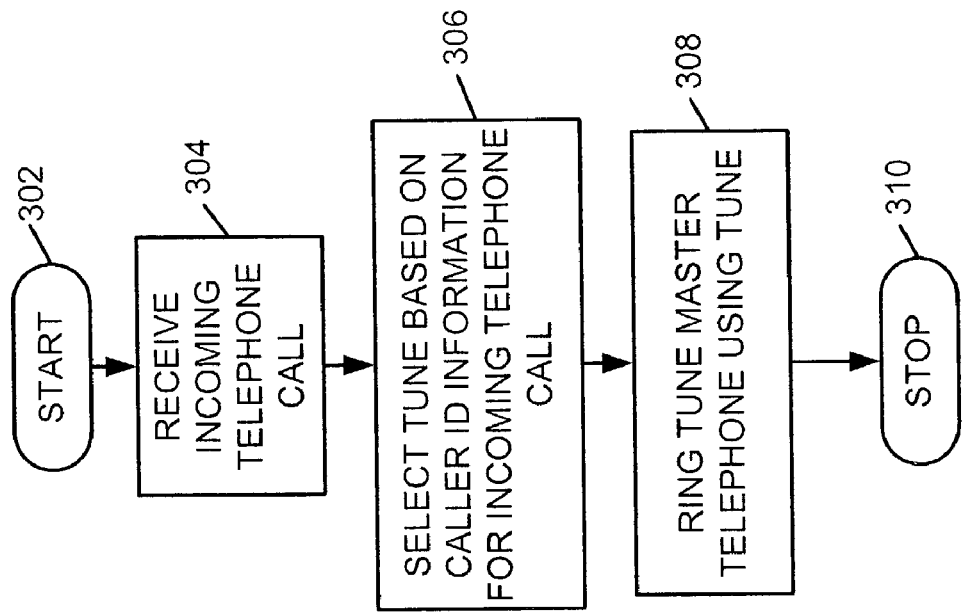

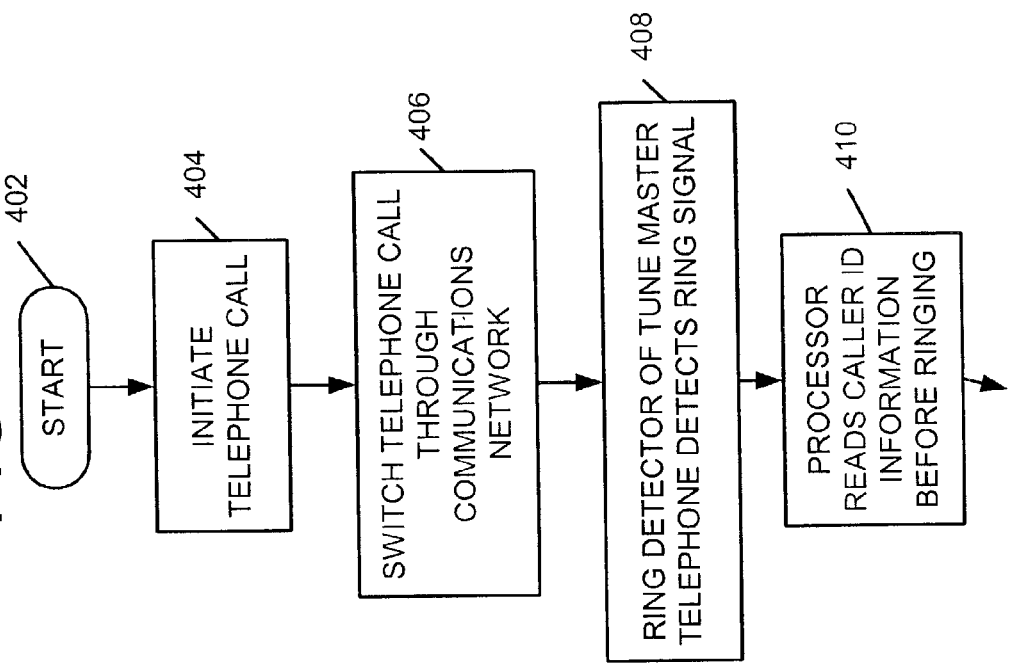

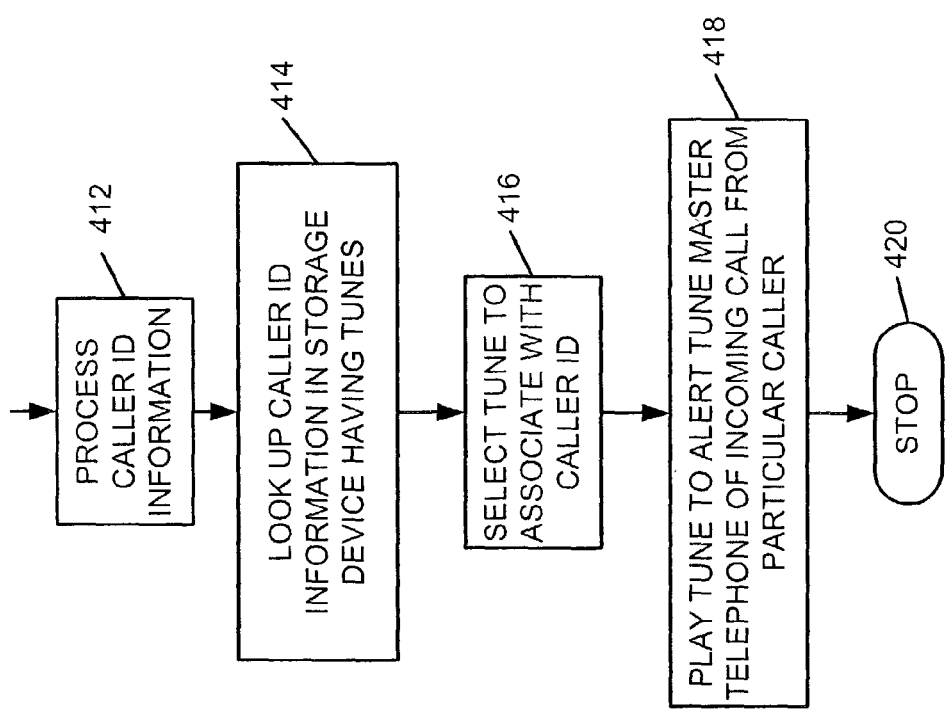

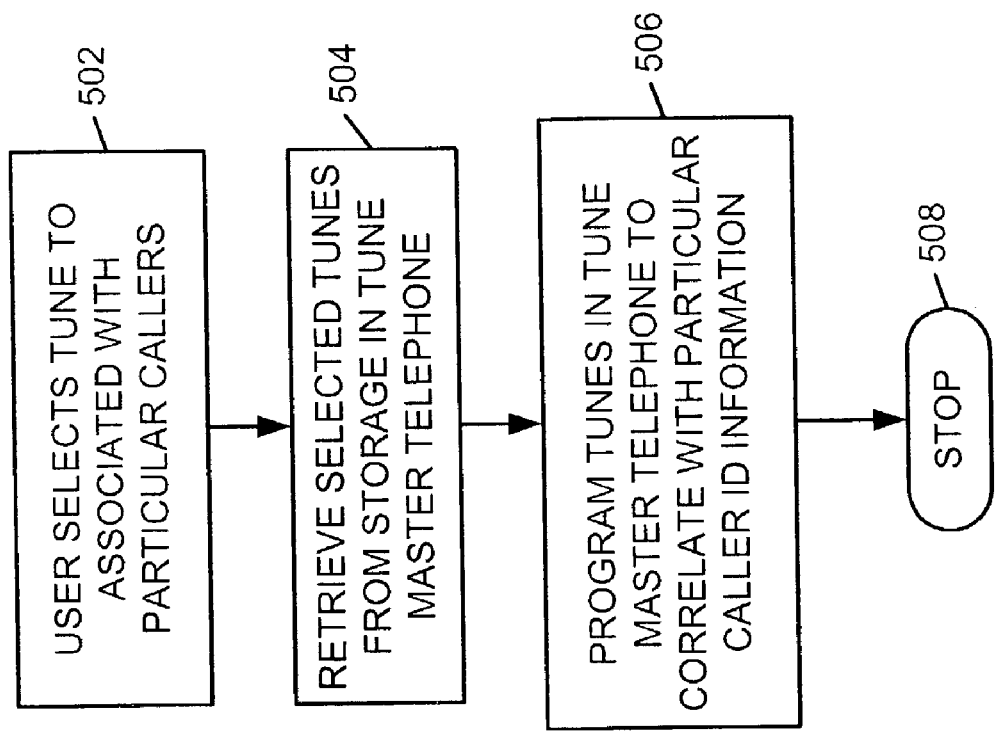

TUNE MASTER TELEPHONE

TECHNICAL FIELD

The present invention is generally related to telecommunications and, more particularly, is related to systems and methods for call ringing.

BACKGROUND OF THE INVENTION

Telephone users find it useful to know the identity of a person calling prior to answering a telephone call. One solution involves providing caller identification information to the called party. Generally, caller identification information includes area code, telephone number, name, and/or city and state information on the calling party. Typically, a user subscribes to a caller identification service from a telephone service provider that presents the caller identification information along with a ringing notification of an incoming telephone call. Effective use of caller identification information often requires the user to have a caller identification equipped telephone or other device, nearby when the telephone rings indicating an incoming call. This is often necessary so that the user can view a display showing the caller identification information prior to answering the call. However, a user may not always be near the device that displays the caller identification information, and thus may not have an opportunity to determine who is calling before answering the telephone.

Thus, a heretofore-unaddressed need exists for a solution that addresses the aforementioned deficiencies and inadequacies.

SUMMARY OF THE INVENTION

The preferred embodiments of the present invention provide systems and methods for a tune master telephone.

Briefly described, in architecture, one preferred embodiment of the system, among others, can be implemented as follows. A tune master telephone system includes a telecommunications network and a communications device that is operatively coupled to the telecommunications network. The telecommunications network is configured to provide caller identification information for an incoming telephone call to the communications device. The communications device is configured to receive the caller identification information, to associate a previously stored tune with the caller identification information in accordance with user configuration, and to play the tune associated with the caller identification information as notification of an incoming call.

The preferred embodiment of the present invention can also be viewed as providing methods for a tune master telephone. In this regard, one embodiment of such a method, among others, can be broadly summarized by the following steps: receiving caller identification information for an incoming telephone call; correlating a previously stored tune with the caller identification information in accordance with user configuration; and playing the tune as notification of the incoming telephone call from the caller associated with the caller identification information.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram depicting a preferred embodiment of an apparatus for implementing a tune master telephone system.

FIG. 3 is a flow chart depicting functionality of a preferred embodiment of an implementation of a tune master telephone system.

FIGS. 4A and 4B are flow charts depicting functionality of a preferred embodiment of an implementation of a tune master telephone system.

FIG. 5 is a flow chart depicting functionality of a preferred embodiment of an implementation of selecting tunes of a tune master telephone system.

DETAILED DESCRIPTION OF THE PREFERRED EMBODIMENTS

Figure 1:
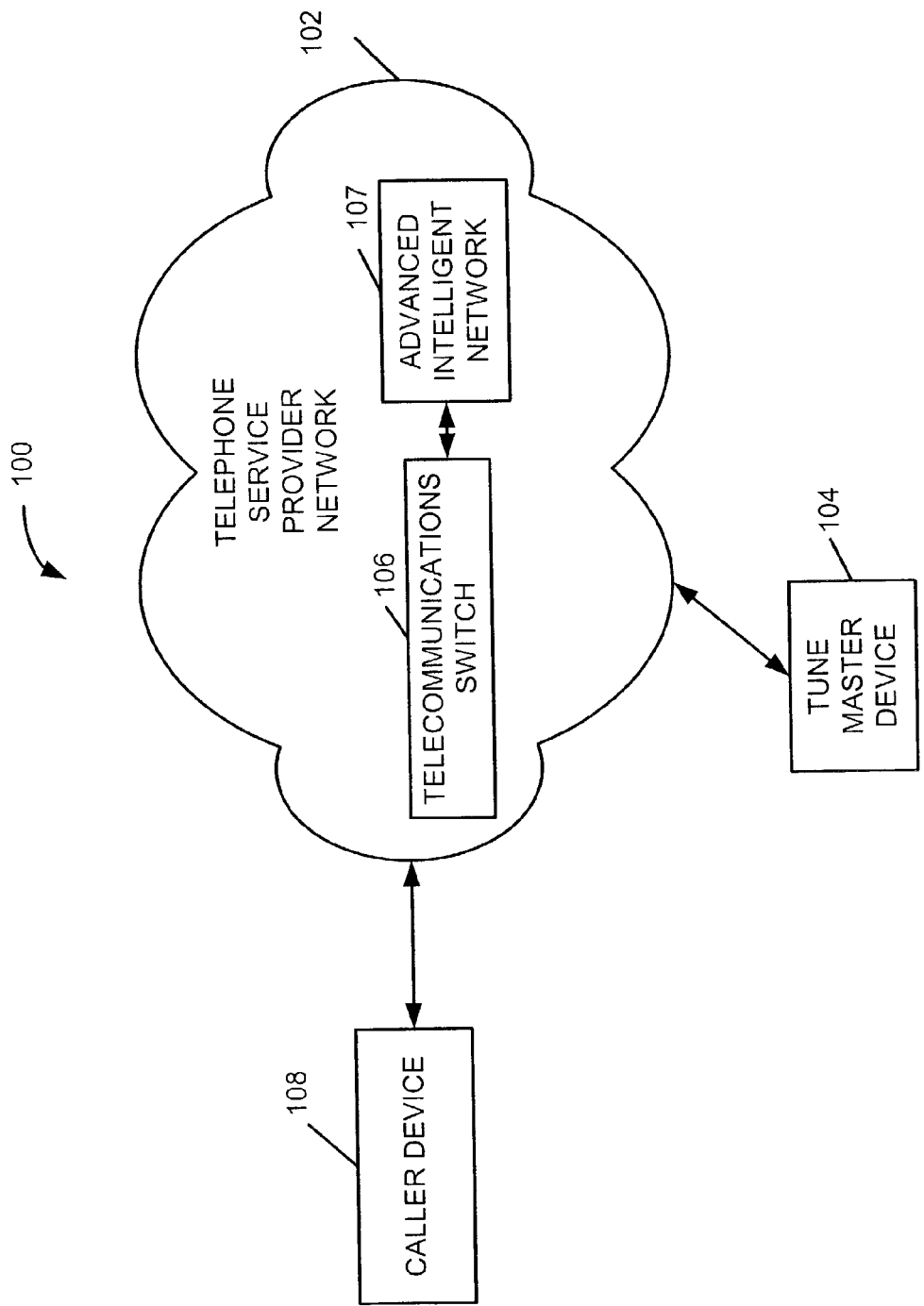
FIG. 1 is a block diagram depicting a preferred embodiment of a tune master telephone system.

Disclosed herein are systems and methods for a tune master telephone. To facilitate description of the inventive system, an example system that can be used to implement the systems and methods for a tune master telephone is discussed with reference to the figures. Although this system is described in detail, it will be appreciated that this system is provided for purposes of illustration only and that various modifications are feasible without departing from the inventive concept. After the example system has been described, an example of the operation of the system will be provided to explain the manner in which the system can be used to provide a tune master telephone.

Referring now in more detail to the drawings, in which like numerals indicate corresponding parts throughout the several views, FIG. 1 is a block diagram depicting a preferred embodiment of a tune master telephone system 100 that includes a telephone service provider network 102 and a tune master device 104 coupled to the telephone service provider network 102. The telephone service provider network 102 may be any type of communications network employing any network topology, transmission medium, or network protocol. For example, such a network may be any public or private packet-switched or other data network, including the Internet, circuit-switched network, such as a public switched telecommunications network (PSTN), wireless network, or any other desired communications infrastructure and/or combination of infrastructure. The telephone service provider network 102 may include a telecommunications switch 106 and an advanced intelligent network 107 which are coupled, directly or indirectly, to the tune master device 104 and a caller device 108. The advanced intelligent network 107 separates telephone service logic from switching equipment, such as telecommunications switch 106, and allows for distributed network intelligence. In a preferred embodiment, the tune master device 104 is an advanced telephone such as an analog display services interface (ADSI) telephone. Generally, an ADSI telephone utilizes a protocol standard that enables the telephone to provide voice and data capabilities utilizing existing telephone lines. Typically, an ADSI telephone will include a screen display, and menu access to applications such as caller identification information, voice mail, and email browsing, among others. Of course, other examples of tune master device 104 is included in other embodiments, including any device with conventional telephony capabilities and an ability to activate one of a plurality of rings based on caller identity.

In one preferred embodiment, the telecommunications switch 106 is encompassed in a public switched telecommunications network. In another preferred embodiment, the telecommunications switch 106 includes a packet-based "soft-switch" that uses software control to provide voice, data, and video services by dynamically changing its connection data rates and protocol types. In still another preferred embodiment, the telecommunications switch 106 supports advanced intelligent network (AIN) 107 componentry that controls many features of the telecommunications switch 106.

In a preferred embodiment, the user of the tune master device 104 subscribes to a caller identification service, such as a service provided by BellSouth Corporation, among others. Caller identification information can include, for instance, a telephone number of the calling party, name of the calling party, or city and state of the calling party. For purposes of this invention, one emphasis is on receiving the telephone number of the calling party as part of the caller identification information. In a preferred embodiment, the tune master device 104 is configured to receive and recognize caller identification information and to play a tune.

In a preferred implementation of this invention, a user of the caller device 108 initiates a telephone call to the tune master device 104. The incoming call and associated caller identification information is switched through at least one telecommunications switch 106 using transmission facilities of the telephone service provider network 102, as is well known in the art. The incoming call reaches the tune master device 104, i.e., call request signalling, such as a ring indication from the telecommunications switch 106 to the tune master device 104. In a preferred embodiment, a user of the tune master device 104 previously associated a particular tune with a particular telephone number. In response to receiving the call request signalling, which would typically cause conventional telephones to simply ring as usual and optionally display caller identification information if available, the tune master device 104 selects the tune from its storage device that is associated with the caller identification information of the incoming call. The tune is played as a "ring" of the tune master device 104. The user of the tune master device 104 is able to recognize the identity of the caller based on the tune played by the tune master device 104.

FIG. 2 is a block diagram depicting a preferred embodiment of an implementation of the tune master device 104 for playing tunes. The tune master device 104 generates a tune (or song, melody, etc.) as a ringtone for an incoming telephone call. The tune master device 104 includes tune selection logic 202 and stored tunes 208 located in a memory 210 connected to (or alternatively located within) a digital signal processor 201. Tune selection logic 202 can be implemented in software (e.g., programming stored on a medium, firmware, etc.), hardware, or a combination thereof. In other embodiments, the memory 210 is located external to the tune master device 104. However, a storage device for stored tunes 208 can include a CD-ROM, DVD, tape, cassette tape, floppy diskette, or other external or internal memory of the tune master telephone 104. In a preferred embodiment, the tunes are selected from a list of pre-programmed tunes. In another preferred embodiment, the tunes are organized according to categories such as tunes for business associates, family members, or other associates. The number and type of tunes is only limited by imagination and available space in the external or internal memory of the tune master telephone 104.

The digital signal processor 201 converts analog signals to digital signals and converts digital signals to analog signals. The digital signal processor 201 could include compression and decompression algorithms, cancellation algorithms, audio-processing circuitry, filter circuitry, and amplification circuitry. Although digital signal processor 201 can be designed to provide differing capabilities and a variety of performance criteria, the basic functions of the digital signal processor 201 are known, and thus, will not be further discussed.

The digital signal processor 201 interfaces with an input/output processor 212. The input/output processor 212 controls system I/O and provides telephony-like control features. A bus 214 provides a signal communication path between the digital signal processor 201 and the input/output processor 212. In a preferred embodiment, the input/output processor 212 is a microprocessor that includes memory (not shown), communication controllers (not shown), and peripheral controllers (not shown). The communication controllers, for example, could control packet-based communications with the telecommunications switch 106 through a network port (not shown). The peripheral controllers provide an interface with a display 216, such as a LCD/LED/CRT display and with telephony-like control features, such as a keypad 218. A clock source 220 provides a system clock for the digital signal processor 201, and the clock source 220 may also include higher and lower frequency multiples of a system clock depending upon power requirements and power availability. A power management system 222 provides differing power control mechanisms, such as a sleep mode and a low power mode, to efficiently utilize available power and to reduce thermal management concerns.

The memory 210 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 210 may incorporate electronic, magnetic, optical, and/or other types of storage media. Note that the memory 210 can have a distributed architecture, where various components are situated remote from one another, but can be accessed by the processing device 201. The software and/or firmware in memory 210 may include one or more separate programs, each of which comprises an ordered listing of executable instructions for implementing logical functions.

The tune selection logic 202 is preferably a source program, executable program (object code), script, or any other entity comprising a set of instructions to be performed. When the tune selection logic 202 is implemented as a source program, then the program needs to be translated via a compiler, assembler, interpreter, or the like, which may or may not be included within the memory 210. Furthermore, tune selection logic 202 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

When the tune selection logic 202 is implemented in software the tune selection logic 202 can preferably be stored on any computer-readable medium for use by or in connection with any computer related system or method. The tune selection logic 202 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, or communicate the program for use by or in connection with the instruction execution system, apparatus, or device. The computer-readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and an optical fiber (optical). If implemented in hardware, as in an alternative embodiment, the tune selection logic 202 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The tune master device 104 plays a tune associated with a particular caller as the notification that the called party is receiving an incoming telephone call. The user of the tune master device 104 can pre-select tunes to associate with a particular caller based on the caller's caller identification information. In a preferred embodiment, the tune master device 104 receives the incoming telephone call signal from the telecommunications switch 106, interrupts normal call processing, processes the caller identification, correlates the caller identification information with a tune, continues processing the telephone call by ringing using the selected tune.

The digital signal processor 201 interfaces with a tune generation system 224. In a preferred embodiment, the tune generation system 224 executes the selected tune and provides the tune. Execution of the selected tune can include correlating the incoming caller identification information with a tune associated with the caller identification information, and then playing the tune in place of the standard ringtone. In another preferred embodiment, the tune generation system 224 plays the standard ringtone as a default if the caller identification information does not have a tune associated with it, or the caller identification information is not presented to the digital signal processor 201. In another preferred embodiment, the tune generation system 224 plays a selectable default tune when no caller identification information is presented. The tune generation system 224 and the digital signal processor 201 could also interface with an external speaker/microphone (mic) system 226 to audibly present the selected tune. A conventional analog handset/microphone 228 that interfaces with the digital signal processor 201 can be used to accept the incoming telephone call upon receipt of the tune identifying the particular caller.

FIG. 3 is a flow chart depicting general functionality (or a method) of a preferred embodiment of an implementation of a tune master telephone system. The process begins at 302. At 304, an incoming telephone call is received by the tune master telephone. In a preferred embodiment, the telephone call, i.e., ring signalling, is sent to the tune master telephone with, or nearly with, associated caller identification information. The tune master telephone interrupts the normal ring detection process. At 306, before ringing, the tune master telephone selects a tune to use as the ringing notification of the incoming call, based on a tune associated with the caller identification information. At 308, the tune master telephone rings using the tune selected at 306. The process ends at 310.

FIGS. 4A and 4B are flow charts depicting more specific functionality (or a method) of a preferred embodiment of an implementation of a tune master telephone system. Referring to FIG. 4A, the process begins at 402. At 404, a caller initiates a telephone call from a caller device to the tune master telephone. In a preferred embodiment, the telephone call, i.e., ring signalling, has caller identification information associated with it. In response to receiving the call request signalling, which would typically cause conventional telephones to simply ring as usual and optionally display caller identification information if available, the tune master telephone selects the tune from its storage device that is associated with the caller identification information of the incoming call. At 406, the telephone call is switched (and/or routed) through the communications network to the tune master telephone. At 408, a ring detector system of the tune master telephone detects the ring signal from the communications network. At 410, a processing device in the tune master telephone recognizes that this is an incoming call having caller identification information and reads the caller identification information before ringing with a standard ring tone.

Referring to FIG. 4B, at 412, the tune master telephone processes the caller identification information recognizing the need to correlate a tune with this particular caller. At 414, the tune master telephone looks up the caller identification information in a storage device having tunes. In a preferred embodiment, the storage device is an internal memory of the tune master telephone having a table that correlate tunes to caller identification information such as telephone numbers. In another preferred embodiment, the storage device is an external memory accessible to the tune master telephone having a table that correlates tunes to telephone numbers. In still another preferred embodiment, the storage device is a tape cartridge associated with the tune master telephone that plays tunes as directed by the tune master telephone. At 416, the tune master telephone selects the tune associated with the caller identification information. At 418, the tune master telephone rings by playing the tune selected at step 416. In a preferred embodiment, if the tune master telephone is unable to correlate a tune to a caller identification information, or if the caller identification information is not presented to the tune master telephone, the tune master telephone rings using a default ring. In a preferred embodiment, the default ring is a default tune selected by the user or a standard ring tone is utilized. The process ends at 420.

FIG. 5 is a flow chart depicting functionality (or method) of a preferred embodiment of an implementation of selecting tunes of a tune master telephone system. The process can be construed as beginning at 502. At 502, a user selects a tune to be associated with a particular caller's telephone number. In a preferred embodiment, the user selects from a plurality of pre-programmed tunes or songs in the tune master telephone. In another preferred embodiment, the user purchases a selection of tunes or songs that are configured to work with the tune master telephone. At 504, the user retrieves the selected tune from a storage device associated with the tune master telephone. At 506, the user programs the selected tune(s) in the tune master telephone to correlate with a caller's caller identification information. In a preferred embodiment, the telephone number will be presented to the user's telephone through caller identification information. The process ends at 508.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method, comprising:
    inputting tunes from an external storage device to a telephone;
    selecting the tunes to correlate with caller identification information;
    receiving caller identification information for an incoming telephone call;
    correlating a tune stored outside of internal memory with the caller identification information;
    determining that the caller identification information is associated with a tune, and playing the tune from a location outside of internal memory as a notification of the incoming telephone call from the caller associated with the caller identification information;
    providing a default tune when no tune is associated with the caller identification information;
    providing a standard ring tone when no caller identification information is received with the incoming telephone call; and
    wherein the tune is stored in memory external to the internal memory;
    wherein the external memory is located remotely from an apparatus housing the internal memory;
    wherein playing the tune as notification of the incoming telephone call from the caller associated with the caller identification information is performed by a tune master telephone configured to play tunes;
    wherein the correlating a tune with the caller identification information further comprises accessing a table stored in memory of a telephone having a list of tunes associated with caller identification information;
    wherein the correlating a tune with the caller identification information further comprises accessing a telephone configured to include tunes associated with the caller identification information from a location outside internal memory that includes at least one of a CD-ROM, DVD, tape, cassette, floppy disk, memory card, or remotely located storage; and
    wherein the selecting the tunes to correlate with the caller identification information further comprises programming a telephone with tunes from a pre-programmed category of tunes provided by the telephone.

2. A computer-readable medium having a computer program for automatically selecting a profile based on location, comprising:
    logic configured to receive caller identification information for an incoming telephone call;
    logic configured to correlate a tune stored in a location outside of internal memory with the caller identification information;
    logic configured to play the tune located outside of internal memory as notification of the incoming telephone call from a the caller associated with the caller identification information;
    logic configured to input the tunes from an external storage device to a telephone;
    logic configured to select the tunes to correlate with the caller identification information;
    logic configured to determine that the caller identification information is associated with a tune, and to play the tune as a notification of the incoming telephone call;
    logic configured to provide a default tune when no tune is associated with the caller identification information;
    logic configured to provide a standard ring tone when no caller identification information is received with the incoming telephone call; and
    wherein the tune is stored in memory external to the internal memory;
    wherein the external memory is located remotely from an apparatus housing the internal memory;
    wherein logic configured to play the tune as notification of the incoming telephone call from the caller associated with the caller identification information is included in a tune master telephone;
    wherein the logic configured to correlate a tune with the caller identification information further comprises logic configured to access a table stored in memory of a telephone having a list of tunes associated with caller identification information;
    wherein the logic configured to correlate a tune with the caller identification information further comprises logic configured to access a telephone configured to include tunes associated with the caller identification information from a location outside internal memory that includes at least one of a CD-ROM, DVD, tape, cassette, floppy disk, memory card, or remotely located storage; and
    wherein the logic configured to select the tunes to correlate with the caller identification information further comprises logic configured to program a telephone with tunes from a pre-programmed category of tunes provided by the telephone.

3. A system, comprising:
    internal memory in an apparatus;
    a storage device located outside the internal memory having a tune associated with a telephone number of an incoming telephone call;
    a processor in an apparatus adapted by the internal memory to communicate with the storage device, to receive the incoming telephone call, to select a tune associated with the telephone number, and to play the tune from the storage device as an audible notification of the incoming telephone call;
    wherein the processor is further adapted to input the tunes from an external storage device to a telephone;

wherein the processor is further adapted to select the tunes to correlate with the caller identification information;

wherein the processor is further adapted to determine that the caller identification information is associated with a tune and to play the tune as a notification of the incoming telephone call;

wherein the processor is further adapted to provide a default tune when no tune is associated with the caller identification information;

wherein the processor is further adapted to provide a standard ring tone when no caller identification information is received with the incoming telephone call;

wherein the tune is stored in memory external to the internal memory;

wherein the external memory is located remotely from an apparatus housing the internal memory;

wherein the processor adapted to play the tune as notification of the incoming telephone call from the caller associated with the caller identification information is included in a tune master telephone;

wherein the processor adapted to correlate a tune with the caller identification information is further adapted to access a table stored in memory of a telephone having a list of tunes associated with caller identification information;

wherein the processor adapted to correlate a tune with the caller identification information is further adapted to access a telephone configured to include tunes associated with the caller identification information from a location outside internal memory that includes at least one of a CD-ROM, DVD, tape, cassette, floppy disk, memory card, or remotely located storage; and wherein the processor adapted to select the tunes to correlate with the caller identification information is further adapted to program a telephone with tunes from a pre-programmed category of tunes provided by the telephone.

* * * * *